United States Patent [19]

Mann

[11] 4,278,881
[45] Jul. 14, 1981

[54] SYSTEM TO SUPERVISE OPERATION OF A BEARING

[75] Inventor: Albrecht Mann, Augsburg, Fed. Rep. of Germany

[73] Assignee: Maschinenfabrik Augsburg-Nurnberg Aktiengesellschaft (M.A.N.), Augsburg, Fed. Rep. of Germany

[21] Appl. No.: 49,133

[22] Filed: Jun. 18, 1979

[30] Foreign Application Priority Data

Jun. 28, 1978 [DE] Fed. Rep. of Germany ....... 2828311

[51] Int. Cl.$^3$ .............................................. G02B 5/14
[52] U.S. Cl. .................................. 250/227; 250/231 R
[58] Field of Search ............ 250/231 R, 227; 73/593, 73/655

[56] References Cited

U.S. PATENT DOCUMENTS

| | | | |
|---|---|---|---|
| 3,781,092 | 12/1973 | Sussman et al. | 250/227 |
| 3,908,444 | 9/1975 | Peter | 73/655 |
| 3,961,184 | 6/1976 | Schurrer | 250/227 |
| 4,147,977 | 4/1979 | Dimmick | 250/227 |
| 4,163,903 | 8/1979 | Robertson | 250/227 |

*Primary Examiner*—David C. Nelms
*Attorney, Agent, or Firm*—Frishauf, Holtz, Goodman & Woodward

[57] ABSTRACT

To evaluate the condition of the bearing, particularly of bearings used in exhaust gas turbo-superchargers, the end cut surface of a light guide bundle having individual light guide fibers or filaments is exposed to a gap between rotating and stationary surfaces, for example the end portion of a sleeve bearing, or a disk attached to the rotating shaft portion of another type of bearing, the light being passed to the bearing gap being evaluated either by counting the light fibers which have a light intensity indicative of the size of the gap at any instant of time, or determining the average light output. If a disk is used, light can be transmitted from one group of bundles through a gap to another group of bundles, the size of the gap varying in dependence on the quality of centricity of the bearing and other operating conditions. Preferably, the bundle is enclosed within a tube, with clearance, and compressed air is supplied within the tube to clean the end surfaces. Some of the light guide filaments, particularly those located at the outer circumference may be continuous, which, if they are severed, provides a positive ON/OFF indication of light therethrough and hence deflection of the shaft in the bearing beyond a permissible value since such excessive deflection caused severing of at least one of those continuous light guides or filaments.

16 Claims, 5 Drawing Figures

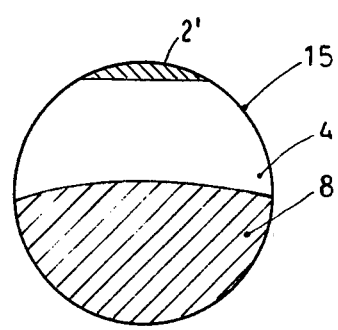
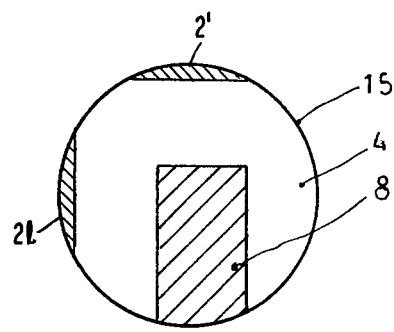
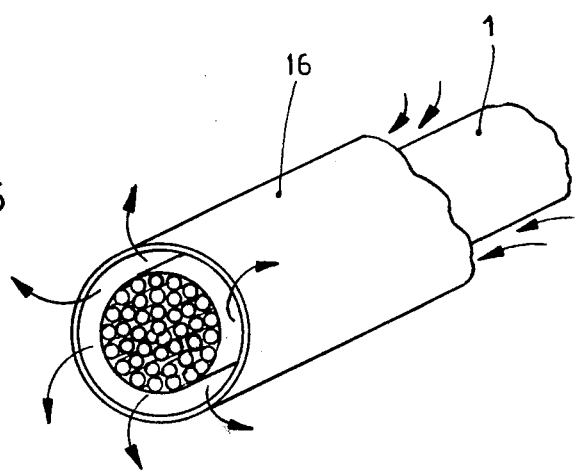

SYSTEM TO SUPERVISE OPERATION OF A BEARING

The present invention relates to a system and apparatus to supervise the operation of a bearing, and more specifically bearings used in exhaust gas turbines to which exhaust gases from internal combustion engines are applied, so that the proper operation of the bearing can be continuously monitored both under static as well as under operating conditions by a non-contacting sensing system.

BACKGROUND AND PRIOR ART

Various types of supervisory apparatus for the operation of bearings have been proposed. Generally, the relative movement between the rotor or rotating part of the bearing with respect to the stator can be checked electronically by using inductive or capacitative transducers to avoid the necessity of contacting elements. Other transducers use eddy current effects. Such apparatus are complex and require application of components to the stationary as well as to rotating portion of the bearing, for example insulated electrodes, electronic transducers and pick-ups, or the like. The presence of lubricant, typically oil, which may be contaminated with dirt or other particles and especially with metal particles derived from the machine portions themselves may interfere with providing an output which is accurately representative of the operation of the bearing as such. The insulating qualities of lubricating oil, for example, can be changed rapidly by the presence of chips, metal dust, or the like, which can be contained therein. Thus, the outputs from such transducer elements are not necessarily truly representative of the condition of the bearing, or the operating condition of the rotating portion thereof.

Temperature of operation is another factor which has to be considered in the selection of a suitable supervisory transducer; many transducer elements cannot operate at high temperatures and, generally, the temperature at which the bearing operates should not be in excess of 80° C. Exhaust gas turbines in which an internal bearing is used may reach bearing temperatures in the order of 200° C. and more when the prime moving motor, from which the exhaust gases are derived, is stopped.

It has also been proposed to supervise the uniformity of rotation by utilizing sensors which respond to vibration or other momentary deflections, similarly to seismic transducers located at the housing of the bearing or some other stationary portion of the structure with which the bearing is associated, for example on a stationary portion of the exhaust gas turbine. It is difficult to obtain accurate output signals truly representative of the operation of the bearing since the output signals are distorted due to the shape and structure of various housing portions which can be triggered to inherent oscillations or vibrations with respectively associated critical frequencies which may occur during rotation of the exhaust gas turbine rotor.

THE INVENTION

It is an object to provide a bearing supervisory system which is simple and which can accurately monitor the operation and condition of the bearing and which, additionally, can be arranged to also monitor the speed of the rotating portion thereof; and which can be used at elevated temperatures, for example at temperatures which can routinely occur in exhaust gas turbines or exhaust gas turbo-chargers.

Briefly, a light guide unit, formed of a bundle of light guide elements or filaments have an exposed end face which is positioned to provide light directed towards both a rotating and a fixed portion of the bearing; an electro-optical transducer system is connected to the light guide filaments including a source of light and a photo-electric transducer picking up light which is reflected from the respective rotating and stationary portions of the bearing, while not picking up light which is directed through the narrow gap formed between the rotating and stationary portion and generally filled with lubricant. The light guide unit can also be arranged to transmit light through the gap, with a second pick-up light guide unit opposite the rotating portion. The rotating portion, additionally, is formed with a surface discontinuity, for example a notch or the like which will provide a light pulse upon rotation of the rotating part of the bearing so that, simultaneously with evaluation of the gap between the rotating and fixed portion, a periodically recurring pulse is provided, with the recurrence time depending on speed, so that one evaluation system can, simultaneously, provide an output signal representative of speed as well as an output signal representative of the bearing condition. In one form of the invention, the rotating element comprises a disk-shaped portion secured to the shaft and rotating therewith, and located within a surrounding ring, leaving a small gap. Any out-of-round conditions of the bearing will be reflected in non-uniformities of the gap as the shaft rotates, thus providing an undulating output signal to the opto-electrical transducer as the light reflected from the portions of the disk and ring, or passing through the gap, respectively, varies with rotation of the shaft. The surface discontinuity, for example the notch, will, additionally, provide a sharp output pulse as the shaft rotates, for example once for each revolution of the shaft if one such notch is present.

The system is essentially independent of ambient temperature conditions; light guide filaments usually use glass or similar fibers so that they can be exposed to high temperatures. Their diameter is so small that the system can be easily arranged in various types of bearings; no special electrical insulation need be provided, thus permitting substantial simplification with respect to electrical or electronic transducers systems. It is readily possible to add such a bearing supervisory system to existing apparatus, and specifically to existing exhaust gas turbines or superchargers.

In all optical systems, the problem of dirt, which interferes with optical transmission, is an ever-present one; to maintain the system clean, the light guide unit, which usually is in the form of a thin, essentially round string, is itself located concentrically within a hollow tube, and a fluid, for example compressed air, is supplied to the measuring point itself in the gap between the outside of the light guide and the inside of the tube, thus preventing the formation of crusts or layers of dirt at the end portion or cut ends of the light guide filaments and keeping the actual transducing portion clean and optically effective.

Drawings, illustrating preferred examples:

FIG. 3 is a greatly enlarged optical representation as seen by an optical supervisory system to check the condition of the bearing, in which the transducer looks in axial direction;

FIG. 4 is a view similar to FIG. 3 in which the transducer looks in tangential direction; and FIG. 5 is a perspective schematic view of a light guide-compressed fluid, and specifically compressed air, combination to provide for continuous cleaning of the light emitting surface of the light guide.

Figure 1:
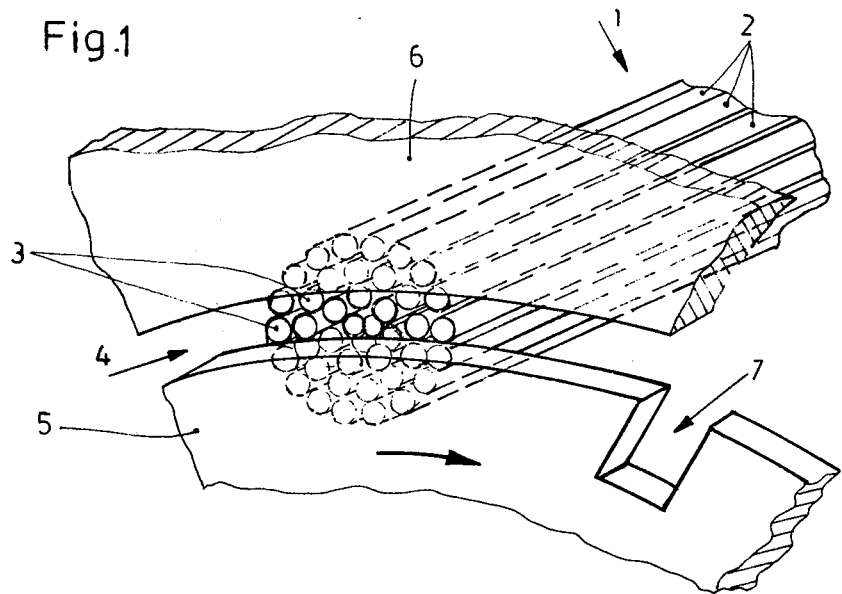
FIG. 1 is a highly schematic, generally perspective view of a light guide unit in relation to the gap formed between a rotating and a stationary portion of a bearing structure.

A light guide unit 1 which is a composite of a large number of light guide filaments or elements 2 has a cut end 3 which is directed towards a gap 4 between a rotating bearing portion 5 and a fixed bearing portion 6. The rotating bearing portion, which can be formed as a separate element or part of the rotating element as such, that is, part of the shaft, is formed with a surface discontinuity, for example a notch 7 which is still within the coverage area of the end surface 3 of the light guide unit 1. An electronic circuit E (FIG. 2) provides light to the light guide unit 2; reflected light is sensed at the light guide elements 2, which can be so arranged that they can evaluate the intensity of light within the light guide 2, that is, whether to be responsive only to the light transmitted thereto or to the light which is transmitted therein and additionally reflected from the respective rotating and fixed portions 5, 6 of the bearing.

The electronic unit E preferably includes a laser-type light source L and an evaluation circuit such as phototransistors or the like.

Operation: Light is directed into the light guide fibers or filaments 2 of the light guide unit 1 and will reach the cut end 3. It will there meet the rotating portion 5, the fixed portion 6, and will be emitted through the gap 4. Depending on the thickness of the gap 4, light will be differentially deflected back to the cut ends 3. Changes in the width of the gap 4 will result in changes in intensity of light within the light guides 2, which changes in intensity can be evaluated in the electronic circuit E, to be transformed into an electrical voltage or current signal. Radial movement of the rotating element 5 with respect to the fixed element 6 thus will be transformed into an electrical analog value which can be used to supervise or monitor the operating condition of the rotor.

The notch 7 within the rotating element 5 results in a pulse-like change of the light within the light guide elements 2 each time the notch 5 passes the coverage area of the cut surfaces 3. This pulse can be used to evaluate the speed of rotation of the rotating element 5, for example by counting the number of pulses in a given time interval (determined, for example, by a clock source) or in other similar and well known speed evaluation circuits. A notch is a simple way of providing a pulse of this type; other surface discontinuities can be used, for example a more highly reflective portion at a specific location of the rotating element, a light absorbing or matte/portion, or the like. Changing merely the optical continuity of the surface has the advantage over a notch that possible mechanical unbalances are avoided at the expense of possible higher manufacturing costs; the notch 7 can be extremely small, however, so that any unbalances are actually a minimum.

The centricity of operation of the rotating part 5 with respect to the fixed part 6 can thus be easily determined; thus, quietness of bearing operation, play in the bearing, out-of-round conditions and the like can be supervised simultaneously with checking of speed of operation. When the rotor is stopped, the gap 4 will usually be twice the width of the gap of the rotor in operation, since the weight of the rotating element will tend to decrease the gap at the lower side and thus increase it at the upper side, where the light guide unit 1 preferably is located. The maximum overall radial gap can thus be readily determined also in stopped condition of the rotating element. The wear in the bearing due to off-center conditions, dirt and other contamination is usually essentially symmetrical with respect to rotation. As the rotor begins to revolve, and particularly when it reaches its operating speed—in exhaust gas turbines frequently several tens of thousands of rpm—the rotor will usually move towards essentially the center of rotation of the bearing. At small eccentric conditions, the rotor will carry out an additional rotary movement about the center of rotation, similar to the precessional movement of the giroscope. Upon substantial eccentricities, the rotor may contact the inner surface of the stationary portion along an inner zone thereof. If the bearing itself has a plurality of surfaces, the contact zones may be at different locations, or at different areas with respect to the angular distribution. To measure radial deflection of the rotor, either statically or dynamically in opertion, and specifically to measure precessional movement within the bearing gap, light emitted from the cut end surface 3 will reliably be reflected more or less from the respective stationary and rotary portions 6, 5 and provide outputs in the form of undulating or varying signals; simultaneously, speed of operation is being checked by the pulse output emanating from the surface discontinuity—however caused or formed—and recurring in the example given once for each revolution of the rotor.

Figure 2:
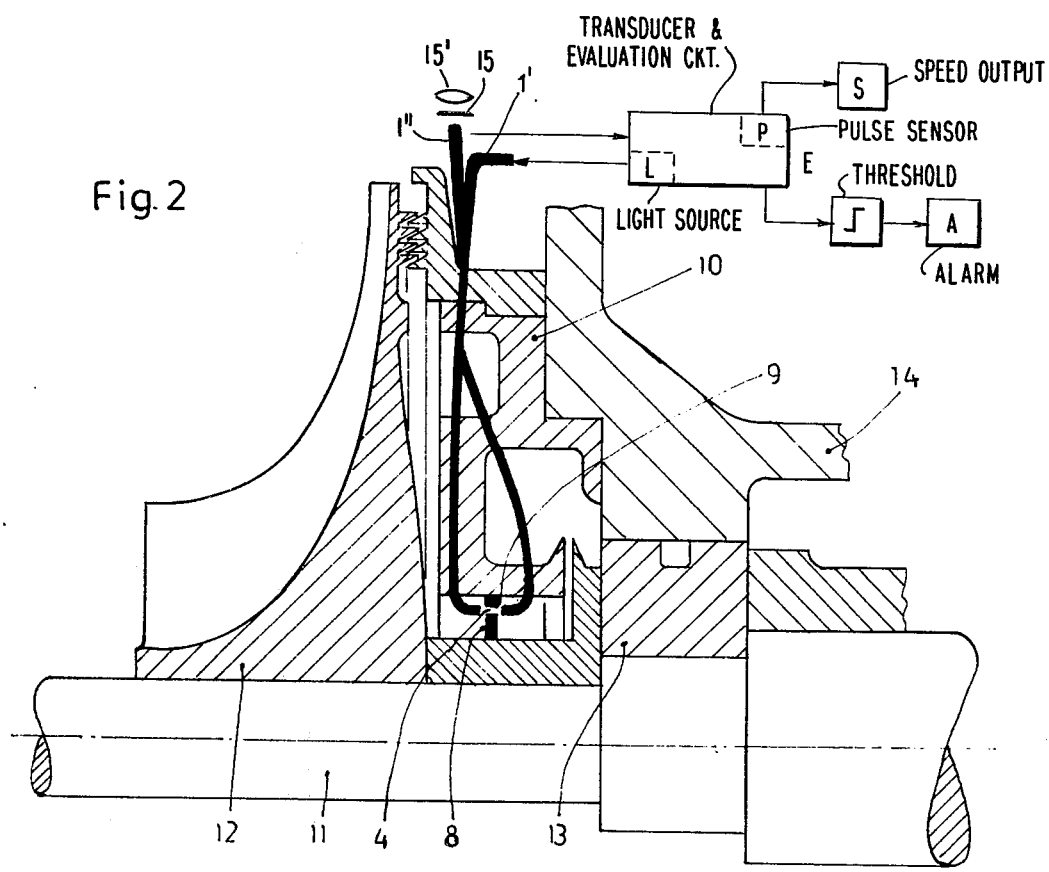
FIG. 2 is a highly schematic axial fragmentary cross section through an exhaust gas supercharger turbine rotor structure and the associated bearing, and illustrating another form of bearing supervisory transducer system.

Embodiment of FIG. 2: Two light guide units 1', 1" are located opposite a disk 8 which is secured to the rotating portion of the bearing, in the embodiment shown to a shaft 11 of an exhaust gas turbine. Opposite disk 8 is a ring 9, secured to the fixed bearing element. The gap 4 is formed between the disk 8 and the ring 9. Ring 9 is secured to the bearing housing or shell 10. An exhaust gas turbine rotor blade assembly 12 is secured to the shaft 11. The rotor itself is rotatable within a sleeve or journal bearing 13 which is secured within the housing or frame portion 14 of the overall turbo charger itself. The light guide bundle portion 1' is exposed to the light source L, preferably a laser, and has a cut surface 3 as illustrated in FIG. 1. The light guide bundle 1" is located at the other side of the disk-ring assembly 9 and has a similar cut portion; it is located in optically coupled position with phototransducers, such as photodiodes, phototransistors or the like, included in the evaluation circuit of the electronic unit E. The end faces 3 of the respective light guide bundles 1', 1" are so positioned with respect to each other that they are in alignment, facing each other, so that the width of the gap 4 will fall essentially centrally of the light guide bundles 1', 1", respectively. The thickness of the gap can be measured by analog or digital evaluation, for example the outputs from respective individual light guides 2 of the light guide bundle 1" can be counted by phototransducers individually associated with the respective fibers 2 in the light guide bundle 1"; the number of light guide fibers or filaments which are illuminated will provide a numerical value which is representative of the radial position of the rotating element, and hence of the quality of the bearing. This numerical value can be applied to a digital read-out system, or transformed into an analog read-out representative of the width of the bearing gap. If the bearing is not round, the numerical value will vary during the rotation of the rotating element of the bearing. Instead of counting the number of individual light guide filaments which are illuminated, variation in the overall light intensity of all the light guide elements 2 can likewise be used to provide an output representative of the width of the gap 4 and changes in the width of the gap 4, as it rotates, similar to the embodiment described in connection with FIG. 1.

The light source L preferably is a laser which, due to its monochromatic characteristics, provides light which is only little deflected upon its passage through the gap 4 which is, in practice, very narrow. These characteristics can be improved by using laser light of high frequency, since refraction phenomena are less at short wave lengths. The wave lengths of the light should, preferably, be as small as possible with respect to the actual dimension of the gap 4 which, in FIG. 1, is shown in greatly exaggerated dimension.

The cut ends 3 are directed in axial direction on the gap 4, as illustrated in FIG. 2, which will provide an output image on a matte surface 15 as shown in FIG. 3. This output image, that is, the size of the gap, can also be observed optically, for example through an optical system 15' shown schematically only as a single lens although, of course, a composite system, for example a microscope system, can be used. It is not necessary that the cut surface 3 is directed axially; the light guide bundles 1', 1''—or the bundle 1 of FIG. 1—can also be directed tangentially, which will lead to an image representation on an imaging surface as seen in FIG. 4. The image of FIG. 4 permits evaluation not only with respect to the radial degree of wear of the bearing, but also of the axial position of the shaft 11 within the bearing, that is, on the axial orientation of the bearing. In FIG. 4, the disk portion 8 is shown off-center, illustrating that the bearing is not perfectly centered with respect to the light guide fiber bundle 1''.

The electronic system E, including an evaluation circuit, can be so arranged that an additional fixed threshold level is added to the output value which, upon exceeding the threshold level, triggers an alarm or a stop-motion system which stops operation of the machine with which the bearing evaluation system is used, for example the exhaust gas turbo-charger turbine. FIG. 2 illustrates connection of the output signal from the bearing evaluation to a threshold circuit T, which is in turn connected to an alarm stage A, such as a visual or audible alarm when the threshold level T is exceeded.

In accordance with a feature of the invention, the alarm can be reliably triggered by arranging at least one light guide element 2 at a radial distance from the center of rotation of shaft 11 which corresponds to maximum permissible bearing play, or deviation of the shaft from true axial position, and carrying this light guide fiber, without a cut 3 from the bundle 1', over to the bundle 1''. When the maximum bearing deviation is exceeded, the shaft will sever this light guide fiber which is fragile. The disk 8, by cutting the respective light guide fiber, will then interrupt light therethrough, and this specific light guide fiber can be connected directly to the alarm system A.

In an illustrative embodiment, permissible bearing play was determined to be 0.2 mm and axial bearing play 0.25 mm. The bundle or unit 1 of light guides 2 had an outer diameter of 1 mm, with individual light guide fibers or filaments 2 of 0.1 mm diameter. Such a light guide unit 1 or 1'—1'', permits sufficient resolution. In the radially outer region of from between 0.3 to 0.5 mm—measured from the center of the light guide bundle—continuous light guide elements 2 will be placed which, upon the bearing exceeding the maximum bearing play, are severed to provide a positive alarm output signal. FIG. 3 illustrates at 2' a few of such light guide fibers in highly schematic form, and which continue from the bundle 1' to the bundle 1'' (FIG. 2). To determine axial play, additional light guide bundles can be located at the two lateral sides of the disk 8, for example as shown at 21, FIG. 4.

Continuous light guide fibers 2, in the positions at 2', 21, respectively, have the advantage that dirt and the like cannot interfere with the effectiveness of the output since light will be continuously transmitted through the filaments themselves. Dirt and other contamination can be a problem; yet, the other measurements can be easily reliable even in the presence of dirt and contamination by applying a cleaning fluid under pressure. A suitable cleaning fluid is compressed air which is directed towards the cut ends 3 to form a continuous flow of fluid which, additionally, has cooling effect. Accumulation of dirt, contamination and masking particles on the light guide elements themselves, and on surface discontinuity 7, is thus prevented. FIG. 5 illustrates an arrangement in which light guide bundle or unit 1 is surrounded by a tube 16 of larger diameter than the outer diameter of the light guide bundle 1. Compressed air is conducted into the gap between the light guide bundle 1 and the tubing 16. Tubing 16 is preferably held concentric to the bundle 1 by spacer elements, introduced at suitable intervals. Compressed air supplied in the gap between the bundle 1 and the tubing 16 will flow from the cut end portions, essentially surrounding the cut end portions, and prevent deposit of dirt or contamination at the end surfaces of the light guide bundle 1, and thus masking of light output therefrom. The same tubing 16 can also be used, in suitable intervals, to conduct a cleaning fluid therethrough in order to ensure that no contamination or dirt can collect in the measuring zone.

The embodiment of FIG. 2 is particularly advantageous since radial excursion can be exactly measured; axial excursion, particularly if the light guides are arranged tangentially (FIG. 4) can also be determined. A comparatively small number of light guide fibers only is needed. use of the disk 8 permits evaluation of the quality of the bearing in which the shaft 11 runs without regard to the type of bearing; the excursion of the shaft can be determined at any position which is easily accessible and to which the disk 8 and the ring 9 can be applied, for example at a portion axially removed from the bearing itself. For example, the disk 8 can be located at a position forming a labyrinth seal for the exhaust gas turbo-charger and adjacent the bearing itself. Using continuous light guide elements 2', 21 (FIGS. 3, 4) has the additional advantage that the evaluation circuit of the electronic component can be simplified since maximum bearing play can be readily supervised by sensing interruption of light transmission through the respective light fibers or filaments, that is, it is only necessary to sense an ON-OFF condition rather than fluctuating values. This arrangement is essentially immune to contamination by dirt and the like. The arrangement of the light guide filaments as shown in FIG. 2, in axial direction, has the advantage of utmost simplicity; arrangement in tangential condition, although somewhat more difficult to install, has the advantage of providing output indications evaluating both the radial as well as the axial position of the bearing. The system additionally permits direct optical observation of the position of the rotating shaft with respect to the bearing by optical system 15′, regardless of whether the system is rotating or stopped. A ground glass screen or similar element can provide a suitable viewing surface for observation of the relative position of the disk 8 within the viewing field of the light guide bundle.

Various changes and modifications may be made, and features described in connection with any one of the embodiments may be used with any of the others, within the scope of the inventive concept.

I claim:

1. Optical supervisory system for a bearing to optically supervise the operation and condition of the bearing, having
    a light source (L);
    a transducer and evaluation means (15, E) receiving light and providing an evaluation output;
and comprising
    two bundles (1′, 1″) of light guide fibers or filaments (2), one of which (1′) is in optically coupled relation to the light source (L) and the other (1″) is in optically coupled relationship to the transducer and evaluation means (E);
    each one of said bundles (1′, 1″) having end cut surfaces (3) facing each other with a distance therebetween to provide a measuring zone;
    a disk element (8) secured to the rotating portion of the bearing, and a ring element (9) surrounding the disk element, with a gap (4) therebetween and secured to the stationary portion of the bearing, said ring element and said disk element being positioned in said measuring zone wherein
    the end cut portions of the light guide fibers or filaments cover the gap (4) and
    the light guide fibers or filaments of one of said bundles transmitting light through said gap (4) to the light fibers or filaments of the other bundle (1″);
    at least some of the filaments (21, 2′) of said bundles are continuous from one of said bundles (1′) to the other of said bundles (1″), and positioned at a distance from said disk (8) corresponding to maximum permissible deviation of said disk from a predetermined standard position to provide, upon deviation of said disk beyond said maximum permissible deviation, a positive ON/OFF signal to the evaluation and transducer means (E) by severing said continuous light fibers or filaments in dependence of deviation of said disk within or beyond the permitted range.

2. System according to claim 1, wherein the diameter of the light guide filaments or fibers (2) is small with respect to the gap (4) between the rotating disk element (8) and the stationary ring element (9).

3. System according to claim 1, wherein the light source is a laser.

4. System according to claim 1, wherein the transducer and evaluation means (E) include means responsive to the light in the individual fibers or filaments, and the evaluation output is responsive to the number of individual fibers or filaments having light flux therein representative of the size of the measuring zone of the bearing in which the rotating disk element (8) and stationary ring element (9) are adjacent each other at any instant of time, and forms a correspondingly representative electrical output signal.

5. System according to claim 1, wherein the transducer and evaluation means includes means responsive to the intensity of light in said light guide fibers or filaments (2), and the evaluation output is responsive to the intensity of light flux which is, overall, transmitted by said group of light guide fibers or filaments and representative of the size of the measuring zone of the bearing in which the rotating disk element (8) and stationary ring element (9) are adjacent each other at any instant of time, and forms a correspondingly representative electrical output signal.

6. System according to claim 4 or 5, wherein the electrical output signal includes frequency varying and amplitude varying components; and
    the transducer and evaluation means (E) evaluates the electrical output signal with respect to at least one of said components.

7. System according to claim 4 or 5, further including threshold circuit means (T) connected to receive the electrical output signal;
    and alarm circuit means (A) responsive to the electrical output signal if the threshold level of said threshold circuit means is exceeded.

8. System according to claim 1, wherein the transducer and evaluation means (E) include optical evaluation means (15, 15′) to optically image the measuring zone of the bearing in which the rotating disk element (8) and stationary ring element (9) are adjacent each other.

9. System according to claim 1, further comprising surface discontinuity means (7) located at the rotating disk element (8) and in optically coupled relationship to the light guide fibers or filaments (2) of the two bundles (1′, 1″) to provide pulse-type output signals from the evaluation output upon passage of the discontinuity past the light guide system to permit obtaining a speed evaluation signal simultaneously with supervising the operation of the bearing.

10. System according to claim 1, further including fluid supply means (16) directing a contamination removing fluid towards the open end face of the light guide fibers or filaments (2).

11. System according to claim 10, wherein the fluid supply means comprises a tube (16) concentric with the light guide fibers or filaments.

12. System according to claim 10, wherein said fluid supply means comprises tubular elements each surrounding one of the two bundles (1′, 1″) of light guide fibers or filaments (2)
    and the contamination removing fluid comprises compressed air.

13. System according to claim 10, wherein said fluid supply means comprises tubular elements each surounding one of the two bundles (1′, 1″) of light guide fibers or filaments (2)
    and the contamination removing fluid comprises a periodically applied cleaning fluid.

14. System according to claim 1, wherein the cut surfaces of the light guide fibers or filaments cover the gap (4) in axial direction.

15. System according to claim 1, wherein the cut surfaces of the light guide fibers or filaments cover the gap (4) in radial direction.

16. System according to claim 1, wherein said light guide fibers or filaments are located with their center surfaces positioned tangentially with respect to said disk element (8) and directed towards said gap (4).

* * * * *